June 22, 1943. E. F. ABER 2,322,408
MILLING MACHINE CHERRYING ATTACHMENT
Filed Dec. 30, 1939 2 Sheets-Sheet 2

INVENTOR
Ernest F. Aber
BY
ATTORNEYS.

Patented June 22, 1943

2,322,408

UNITED STATES PATENT OFFICE 2,322,408

MILLING MACHINE CHERRYING ATTACHMENT

Earnest F. Aber, Racine, Wis.

Application December 30, 1939, Serial No. 311,877

10 Claims. (Cl. 90—11)

This invention relates to improvements in milling machines and more particularly to an attachment adapted for cherrying and like work.

In the use of milling machines it frequently occurs that certain types of recesses such as those of radial type must be cut in the work, necessitating the use of special cutters. Heretofore, a few attempts have been made to devise cherrying attachments for supporting a rotatable cutting wheel but these attachments have been objectionable. In these prior constructions the rotatable cutter has been supported on horizontally disposed arms which are in alinement with the axis of the cutting wheel, whereas the major thrust during cutting is upwardly and at an angle rearwardly with respect to the progress of the cutter relative to the work. As a result, these former cutters were poorly supported and there was excessive chattering during use, resulting in wear on the parts and inferior work. In addition, because of the type of support employed, these cutters have of necessity been supported within the frame work of the attachment, so that the operator's view of the work was obstructed.

It is one of the objects of the present invention to obviate the above mentioned objectionable features by providing a device wherein the cutter is supported by arms which extend at such an angle as to resolve the thrust strains into two equal components which extend at an angle upwardly to transmit said strains to strong portions of the supporting frame whereby the cutter is rigidly supported in a way to eliminate chattering.

A further object of the invention is to provide a device as above described wherein said arms effectively support the cutter below the supporting frame whereby the operator has unobstructed view of the work.

A further object of the invention is to provide a device of the class described wherein the vertical position of the cutter driving pinion may be readily adjusted to cooperate with cutting wheels of different diameters.

A still further object of the invention is to provide interchangeable means for selectively supporting cutting wheels having arbor holes of different diameters.

A further object of the invention is to provide an improved cutting wheel for milling machines wherein the peripheral teeth are curved or substantially U-shaped in plan view to produce a shear type of cut; said teeth also being especially adapted to cooperate with similarly shaped teeth on a driving pinion to eliminate the possibility of lateral play during rotation of the cutting wheel.

With the above and other objects in view the invention consists of the improved milling machine and all its parts and combinations as set forth in the claims and all equivalents thereof.

In the accompanying drawings illustrating one complete embodiment of the preferred form of the invention in which the same reference numerals designate the same parts in all of the views.

Figure 4:
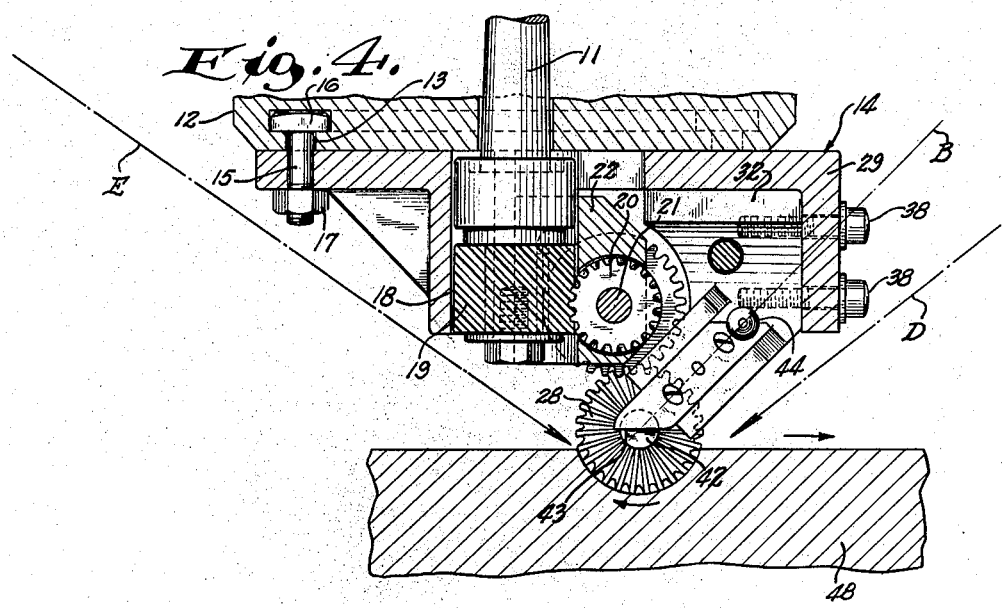
Fig. 4 is a sectional view taken on line 4—4 of Fig. 3 showing the cutting wheel in engagement with the work.

Referring more particularly to the drawings, the numeral 10 designates the frame of a milling machine which may be of any desired type adapted to impart rotating movement to a vertical spindle 11. The milling machine may have a depending ring shaped supporting member 12 formed on its bottom face with a circular groove 13 which is T-shaped in cross section as illustrated in Fig. 4. The supporting frame 14 for the milling machine attachment may be supported from the bottom of the ring 12 by bolts 15 which have T-shaped heads 16 engageable with the T-shaped groove 13 as shown in Fig. 4. By loosening nuts 17 the member 14 may be adjusted to a desired position around the spindle 11 and held in such position by tightening the nuts.

Rigidly secured to the lower end of the spindle 11 and rotatable in a bore 18 of the frame 14 is a gear 19 having spirally arranged teeth which engage complementary teeth on a gear 20 rigidly mounted on a shaft 21. The shaft 21 has its ends journalled in a block 22 and said block contains a longitudinal half of the bore 18 within which the spiral gear 19 rotates. The block 22 has a tongue and groove engagement 23 with a cross piece 24 of the frame 14 and said cross piece also has vertical slots 25 (see Fig. 1) for the reception of bolts 26 which are threaded into openings in the movable block 22. By loosening the bolts 26 the block 22 may be moved vertically up and down for a purpose to be hereinafter described. Due to the extra length of the spiral gear 19 the cooperating gear 20 is always in engagement therewith in any position of adjustment of the block 22.

Also rigidly mounted on the horizontal shaft 21 is a driving pinion 27 which is cooperable with the teeth of a rotating cutter 28.

Figure 1:
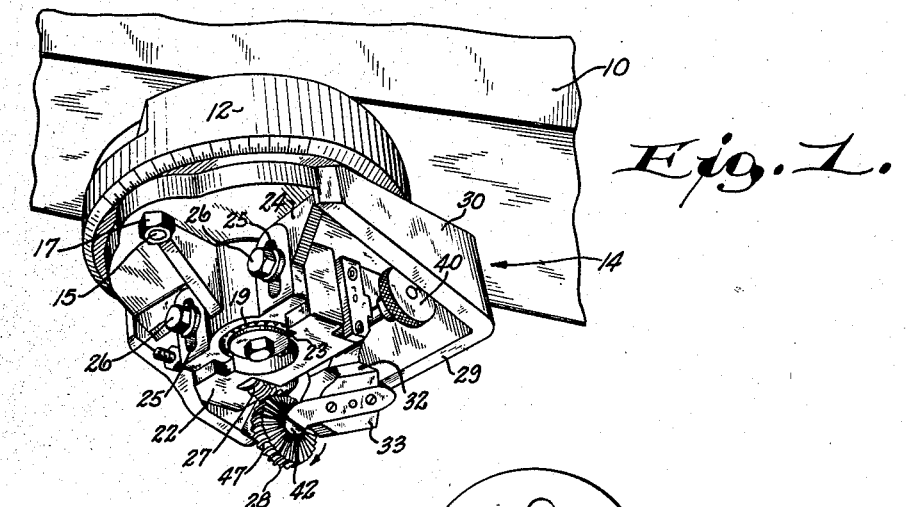
Fig. 1 is a perspective view looking upwardly and at an angle, illustrating the improved attachment connected to a portion of a milling machine.

The frame 14 has a depending integral front wall 29 and side walls 30 which taper upwardly toward the rear as shown in Fig. 1. Positioned against the top plate 31 of the frame 14 and against the front wall 29 are spaced blocks 32 which have faces 33 disposed at an angle of approximately 45° with respect to the top plate 31 of the frame 14. These faces 33 have grooves 34 cut therein and a dowel pin 35 projects outwardly from each groove. Supporting arms 36 having openings for receiving the upper ends of the dowel pins are fitted in the grooves 34 and are removably retained in position by bolts 37.

Figure 3:
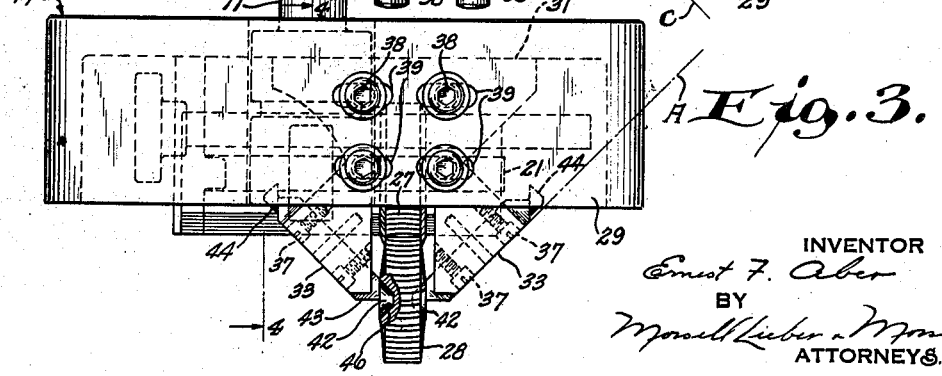
Fig. 3 is a front elevational view thereof.

The blocks 32 are adjustably secured in position by bolts 38 which extend through horizontal slots 39 in the front wall 29 of the frame (see Fig. 3). These bolts are threaded into the blocks 32 and when the bolts are loosened the blocks may be moved apart by manipulation of a hand wheel 40 which rotates a screw 41 having right and left hand threaded sections engageable with threaded bores of the blocks 32.

Figure 2:
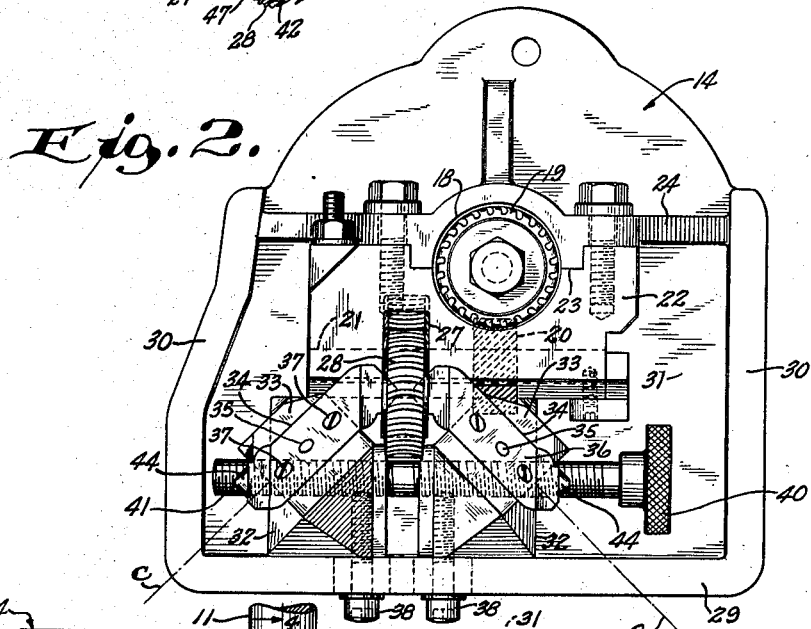
Fig. 2 is a bottom view of the attachment.

It is to be noted that the blocks 32 support the arms 36 at an angle of approximately 45° with respect to the top plate 31 of the frame as indicated by the line A in Fig. 3 and also at an angle of approximately 45° with respect to the front wall 29 of the frame when viewed in front elevation as indicated by the line B in Fig. 4. In addition, these arms are at an angle of approximately 45° with the front wall 29 when considering a horizontal plane and when viewing the work-engaging peripheral portion of the wheel from the position of the work as indicated by the line C in Fig. 2.

Each of the supporting arms 36 has its outer end formed with an arbor 42 which is in the shape of a truncated cone and the sides of which are at an angle of approximately 45°. The lowermost end of each supporting arm is cut off straight in a horizontal plane as at 43 so that one half of the cone shaped arbor 42 projects below the cut off 43. The other end of each supporting arm 36 is formed in a similar manner except that the arbor 44 is smaller in diameter for cooperation with a smaller arbor hole in a cutting wheel 28. It is apparent that by removing the screws 37 the supporting arms 36 may be reversed in position to permit use of the arbors 44.

The cutting wheel 28 has arbor holes 46 of complementary shape to the arbors 42 and the cutter may be inserted in position while the supporting blocks 32 are spread apart. The hand wheel 40 may then be turned to bring the arbors 42 into engagement with the cutting wheel 28 so that the same is properly supported for rotation in the manner shown in Fig. 3. By having the adjustable block 22 for supporting the driving pinion 27 the driving pinion may be readily moved into engagement with cutting wheels of various diameters.

Figure 5:
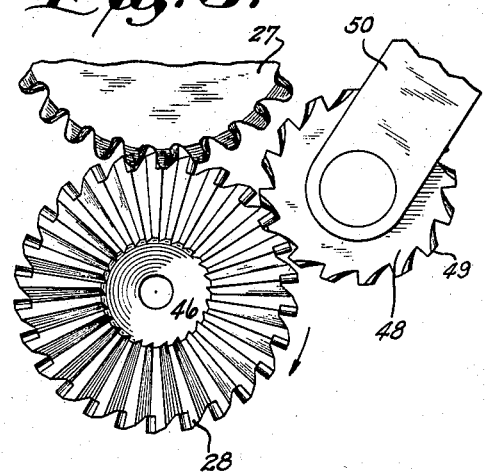
Fig. 5 is a side view on an enlarged scale of the cutting wheel and driving pinion therefor, part of the pinion being broken away, the view also showing a modification wherein an additional bracing idler pinion is employed.
Figure 6:
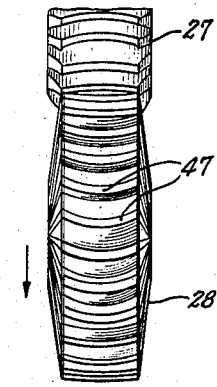
Fig. 6 is a front view of part of the mechanism illustrated in Fig. 5.

The cutting wheel 28 is of improved construction as shown in Figs. 5 and 6 and includes peripheral teeth 47 which are preferably curved or substantially U-shaped in plan view as shown in Fig. 6. In lieu of having gradual curves the teeth may have straight diverging sides. It is apparent that with this arrangement and with the cutter rotating in the direction indicated by the arrow in Fig. 1 that there will be a shear cut due to the shape of the teeth.

The driving pinion 27 is formed with teeth of similar shape and these teeth interlock during rotation to prevent lateral movement of the cutting wheel and to aid in reducing chattering.

In use of the improved attachment it is apparent that rotation of the vertical spindle 11 from the milling machine will through the spiral gears 19 and 20 transmit rotation to the driving pinion 27, the latter driving the cutting wheel 28 in the direction indicated by the arrows in Figs. 1 and 4. Movement of the work 45 relative to the milling machine in the direction indicated by the arrow in Fig. 4 will set up strains extending upwardly and also in the general direction of the wall 29 of the supporting frame. Due to the angular disposition of the supporting arms as indicated by the lines A, B and C heretofore referred to, these strains are resolved into two equal components and transmitted directly to the front wall 29 of the supporting frame and to the top wall of said frame. Inasmuch as these walls are strong the strains are absorbed without producing chattering of the cutting wheel. It is further to be noted that the method of support by the depending angularly disposed arms positions the axis of the cutting wheel well below the lower edges of the front wall 29 and side walls 30. Thus the operator has clear vision as indicated by the lines D and E of Fig. 4 and may watch his work while the cutting is progressing. In prior devices where the cutting wheel is supported for rotation on horizontal arms, the strains are at right angles to said supporting arms and chattering results. Furthermore, in these structures, due to the method of support the cutting member is well elevated and partially within the supporting frame so that the latter obstructs the operator's vision.

While the angle of 45° for the lines A, B and C has been found to be most desirable it is not intended that this invention be limited to this specific angle as other angles are more or less effective.

In the modification of Fig. 5, an idler pinion 48 having teeth 49 which are cut on an arc to conform to the shape of the teeth 47 of the cutting wheel 28, is rotatably supported by a forked or other suitable member 50. The upper ends of the member 50 may be secured to one of the supporting blocks 32. It is apparent that with the cutter rotating in the direction indicated by the arrow in Fig. 5, and with a relative feed movement between the cutter and the work in the direction of the arrow in Fig. 4, that the idler 48 will additionally brace the cutter against thrusts in a direction toward said idler 48.

For subject matter shown but not claimed herein, reference is made to my application Serial No. 333,067, filed May 3, 1940, and to my application Serial No. 455,837, filed August 24, 1942.

Although only two forms of the invention have been shown and described it is obvious that various modifications and changes may be made without departing from the spirit of the invention and all of such changes are contemplated as may come within the scope of the claims.

What I claim is:

1. A milling device comprising a supporting frame having a depending wall, a rotatable wheel positioned so that its plane of rotation extends transversely of the plane of said depending wall and having cutting teeth on its periphery, and means for supporting said wheel below said frame, said means including supporting arms having a bracing relationship with said wall which project downwardly from the frame and which are at an oblique angle in said elevational view with respect to said depending wall when viewing a face of the rotatable wheel, said wall being so positioned with respect to the direction of rotation of the cutter and with respect to the direction of extent of the arms as to take the major thrust strains from the rotatable cutting wheel.

2. A milling device comprising a supporting frame having a depending wall, a rotatable wheel positioned so that its plane of rotation extends transversely of the plane of said depending wall and having cutting teeth on its periphery, and means for supporting said wheel below said frame, said means including downwardly converging supporting arms having a bracing relationship with said wall which project downwardly from the frame and which are at an oblique angle in side elevational view with respect to said depending wall when viewing a face of the rotatable wheel, said wall being so positioned with respect to the direction of rotation of the cutter and the direction of extent of the arms as to take the major thrust strains from the rotatable cutting wheel.

3. A milling device comprising a supporting frame having a depending wall, a rotatable wheel having cutting teeth on its periphery, and means for supporting said wheel below said frame, said means including downwardly converging supporting arms which are at an angle of approximately 90° with respect to each other and which project downwardly from the frame and which are at an angle of approximately 45° in side elevational view with respect to said depending wall.

4. A milling device comprising a supporting frame having a depending wall, a rotatable wheel positioned so that its plane of rotation extends transversely of the plane of said depending wall and having cutting teeth on its periphery, and means for supporting said wheel below said frame, said means including supporting arms having a bracing relationship with said wall which project downwardly from the frame and which are at an angle of approximately 45° in side elevational view with respect to said depending wall when viewing a face of the rotatable wheel, said wall being so positioned with respect to the direction of rotation of the cutter and with respect to the direction of extent of the arms as to take the major thrust strains from the rotatable cutting wheel.

5. A milling device comprising a supporting frame, a wheel having cutting teeth on its periphery, means for rotatably supporting said wheel from the frame, a vertically disposed spindle rotatable in said frame, a spiral gear on said spindle, a shaft disposed at approximately right angles to said spindle, a block vertically adjustably connected to said frame within which said shaft is journalled, a spiral gear on said shaft driven by the spiral gear on the spindle, and a cutter driving pinion also mounted on said shaft, said spiral gear on the spindle being of such length as to provide for engagement with the driven spiral gear in all positions of adjustment of the adjustable block whereby the cutter driving pinion may be moved into proper engagement with the cutter wheel.

6. A milling device comprising a supporting frame having a depending wall, a rotatable cutting wheel positioned so that its plane of rotation extends transversely of the plane of said depending wall and having cutting teeth on its periphery, and means for supporting said wheel below said frame, said means including downwardly converging supporting arms which are at an angle of less than 180° with respect to each other, and which project downwardly from the frame, and which are at an acute angle in side elevational view when viewing a face of the rotatable wheel with respect to said depending wall.

7. A milling device comprising a supporting frame, a wheel having cutting teeth on its periphery, means for rotatably supporting said wheel from said frame, a spindle rotatable in said frame, a spiral gear on said spindle, a shaft disposed transversely of said spindle, a block connected to said frame within which said shaft is journalled, said block being adjustable in a direction longitudinally of the spindle, a spiral gear on said shaft driven by the spiral gear on said spindle, and a cutter driving pinion also mounted on said shaft, said spiral gear on the spindle being of such length as to provide for engagement with the driven spiral gear in all positions of adjustment of the adjustable block, whereby the cutter driving pinion may be moved into proper engagement with the cutter wheel.

8. A milling device comprising a supporting frame, a wheel having cutting teeth on its periphery, means for rotatably supporting said wheel from the frame, a driving pinion cooperable with the teeth on the cutting wheel to drive the latter, an adjustably mounted shaft on which said pinion is mounted, a driving spindle extending transversely of said shaft, and means including cooperating spiral gears on said shaft and spindle for driving said shaft, one of said spiral gears being of such length as to provide for engagement of the other spiral gear therewith in all positions of adjustment of the pinion shaft, whereby the cutter driving pinion may be moved into proper engagement with the cutter wheel.

9. A milling device comprising a supporting frame having a depending wall, a rotatable cutting wheel positioned inwardly of said wall beneath said frame with its plane of rotation extending transversely of the plane of said depending wall and having cutting teeth on its periphery, and means for supporting said wheel below said frame, said means including downwardly converging supporting arms which extend at an oblique angle with respect to said depending wall when viewing a face of the cutting wheel and which have a bracing cooperation with said wall so that horizontal thrust strains are transmitted longitudinally of said arms to said wall.

10. A milling device comprising a supporting frame having a depending wall, a rotatable wheel positioned so that its plane of rotation extends transversely of the plane of said depending wall and having cutting teeth on its periphery, means for supporting said wheel below said frame, said means including downwardly converging supporting arms having a bracing relationship with said wall, which project downwardly from the frame and which are at an oblique angle in side elevational view with respect to said depending wall when viewing a face of the rotatable wheel, and which are at an oblique angle with respect to the sides of the wheel when viewing the periphery of the wheel from beneath the frame.

EARNEST F. ABER.

CERTIFICATE OF CORRECTION.

Patent No. 2,322,408.                                June 22, 1943.

EARNEST F. ABER.

It is hereby certified that error appears in the printed specification of the above numbered patent requiring correction as follows: Page 3, first column, line 1, claim 1, for "said" read --side--; and that the said Letters Patent should be read with this correction therein that the same may conform to the record of the case in the Patent Office.

Signed and sealed this 27th day of July, A. D. 1943.

Henry Van Arsdale, (Seal)                    Acting Commissioner of Patents.